(12) United States Patent
Lenke et al.

(10) Patent No.: US 10,747,497 B2
(45) Date of Patent: *Aug. 18, 2020

(54) AUDIO STREAM MIXING SYSTEM AND METHOD

(71) Applicant: Cerence Operating Company, Burlington, MA (US)

(72) Inventors: Nils Lenke, Rheinbach (DE); Christophe Couvreur, Sint-Pieters-Kapelle (BE)

(73) Assignee: CERENCE OPERATING COMPANY, Burlington, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/663,426

(22) Filed: Oct. 25, 2019

(65) Prior Publication Data

US 2020/0057601 A1 Feb. 20, 2020

Related U.S. Application Data

(63) Continuation of application No. 16/058,200, filed on Aug. 8, 2018, now Pat. No. 10,459,686.

(51) Int. Cl.
| | |
|---|---|
| *G10L 15/04* | (2013.01) |
| *G10L 15/22* | (2006.01) |
| *G10L 25/78* | (2013.01) |
| *G06F 3/16* | (2006.01) |

(52) U.S. Cl.
CPC .............. *G06F 3/165* (2013.01); *G10L 15/04* (2013.01); *G10L 15/22* (2013.01); *G10L 25/78* (2013.01)

(58) Field of Classification Search
CPC ......... G06F 3/165; G10L 15/04; G10L 15/22; G10L 21/04; G10L 25/48; G10L 25/78; G11B 27/038
USPC ........................................................ 381/119
See application file for complete search history.

(56) References Cited

U.S. PATENT DOCUMENTS

| | | | |
|---|---|---|---|
| 5,768,126 A | 6/1998 | Frederick | |
| 6,766,407 B1 | 7/2004 | Lisitsa | |
| 8,359,382 B1 | 1/2013 | Gailloux | |
| 2017/0293460 A1 | 10/2017 | Brown | |
| 2019/0042185 A1 | 2/2019 | Young | |

*Primary Examiner* — Vivian C Chin
*Assistant Examiner* — Friedrich Fahnert
(74) *Attorney, Agent, or Firm* — Occhiuti & Rohlicek LLP (57) ABSTRACT

Provided are a system and method of mixing a second audio stream with a first audio stream in an audio output device. The system is configured to execute the method, comprising buffering and outputting the first audio stream via the audio output device as unmodified output, determining at least one insertion spot within the first audio stream, modifying the first audio stream at an insertion spot to avoid content loss, outputting the second audio stream at the insertion spot, and resuming unmodified output of the first audio stream at or near a completion of the second audio stream. Modifying the first audio stream can include pausing and/or warping the first audio stream at the insertion spot. The audio output device can be a vehicle head unit or a wireless device, such as a mobile phone.

23 Claims, 7 Drawing Sheets

AUDIO STREAM MIXING SYSTEM AND METHOD

CROSS REFERENCE TO RELATED APPLICATION

This application is a continuation of U.S. patent application Ser. No. 16/058,200, filed on Aug. 8, 2018, the entire contents of all of which are incorporated by reference herein.

BACKGROUND OF THE DISCLOSURE

1. Field of the Disclosure

The present disclosure relates to the field of audio stream processing, and more particularly to combining a plurality of audio output streams.

2. Description of Related Art

A growing number of audio sources are competing for the audio channel of a user's device. For example, in a vehicle, a plurality of different audio sources could compete for the driver's and passenger's attention. In an automobile, as perhaps the most common example, the competing audio devices can include, but are not limited to:
Radio;
Streamed music, audio books and other media;
Automotive assistant;
Navigation system; and
Car status and safety announcements.

When announcements from the car, an assistant, or a navigation system, as examples, have to be played out, any ongoing streams from an infotainment system can be lost. The outgoing infotainment streams can include music and/or talk and can be sourced from any of a number of channels or media, such as a radio, a mobile device, music, a vehicle hard drive, a compact disc (CD), unified serial bus (USB), and so on.

When a second stream of audio, such as an announcement from the vehicle or navigation system, is received, the first (e.g., infotainment) stream is typically muted or suppressed, usually by setting the output volume for the infotainment stream at or near 0. In such case, the infotainment audio output that has been muted or suppressed can be completely lost. As a result, the listener may miss information from a radio news program or from an audio book, as example, s/he is listing to as the infotainment stream. This can materially degrade the infotainment experience for all listeners.

Also, typically the announcements are output with no consideration for the first, e.g., infotainment, stream output. As a result, the announcement can appear in the middle of a word or sentence, which can further degrade consumption of the infotainment content by all listeners.

SUMMARY

In accordance with aspects of the inventive concepts, provided is a method of mixing a second audio stream with a first audio stream in an audio output device, the method comprising buffering the first audio stream, determining an insertion spot within the first audio stream, outputting the buffered first audio stream, including modifying output of at least a portion of the first audio stream to accommodate output of the second audio stream at the insertion spot to minimize or avoid content degradation or loss of the first audio stream, outputting the second audio stream at the insertion spot, and continuing output of the buffered first audio stream after completion of the second audio stream.

In various embodiments, the second audio stream is received during output of the first audio stream.

In various embodiments, the buffering of the first audio stream occurs in response to receipt of the second audio stream.

In various embodiments, the first audio stream is a radio stream.

In various embodiments, the first audio stream is playback of content from a tangible storage medium local to the audio output device.

In various embodiments, the tangible storage medium is a compact disc, unified serial bus medium, hard drive, or a computer memory.

In various embodiments, the second audio stream is received by the audio output device with an urgency or maximum delay indicator.

In various embodiments, the method includes identifying a maximum delay for output of the second audio stream based on the urgency or maximum delay indicator.

In various embodiments, the method further comprises determining the insertion spot based, at least in part, on the urgency or maximum delay indicator.

In various embodiments, determining the insertion spot includes finding a gap or pause within the first audio stream.

In various embodiments, determining the insertion spot includes analyzing the first audio stream using one or more speech analysis techniques to find ends of sentences, phrases, words, or other natural points of interruption.

In various embodiments, the one or more speech analysis techniques includes at least one of Voice Activity Detection (VAD), Automatic Speech Recognition (ASR), and Natural Language Understanding (NLU).

In various embodiments, determining the at least one insertion spot includes finding a low volume level within the first audio stream.

In various embodiments, modifying the first audio stream at the insertion spot includes pausing the first audio stream at the insertion spot.

In various embodiments, modifying the first audio stream at the insertion spot includes modifying a time-frequency structure of the first audio stream.

In various embodiments, modifying the first audio stream at the insertion spot includes warping the first audio stream at or near the insertion spot.

In various embodiments, outputting the second audio stream at the insertion spot includes modifying the second audio stream.

In various embodiments, modifying the second audio stream includes modifying a time-frequency structure of the second audio stream.

In various embodiments, modifying the second audio stream includes modifying a voice style of the second audio stream to improve intelligibility relative to the first audio stream.

In various embodiments, the audio output device is or forms part of a vehicle head unit.

In various embodiments, the second audio stream is an announcement or an alert from a vehicle navigation system, vehicle monitoring system, or a text to speech system.

In various embodiments, the second audio stream is an announcement or an alert from an advertising system.

In various embodiments, the audio output device is a wireless portable device comprising a mobile phone, tablet, or phablet.

In accordance with another aspect of the inventive concepts, provided is an audio stream mixing system, comprising one or more processors coupled to one or more computer storage devices, one or more first audio stream sources, one or more second audio stream sources, and one or more audio output devices. The one or more processors are configured to buffer the first audio stream from a first audio stream source in the one or more computer storage devices, determine an insertion spot within the first audio stream, output the buffered first audio stream via the one or more audio output devices, wherein the one or more processors are configured to modify output of at least a portion of the first audio stream to accommodate output of a second audio stream at the insertion spot to minimize or avoid content degradation or loss of the first audio stream, the second audio stream received from a second audio stream source, output the second audio stream via the one or more audio output devices at the insertion spot; and continue output of the buffered first audio stream via the one or more audio output devices after completion of the second audio stream.

In various embodiments, the second audio stream is received during output of the first audio stream.

In various embodiments, the one or more processors are configured to buffer the first audio stream in response to receipt of the second audio stream.

In various embodiments, the first audio stream is a radio stream.

In various embodiments, the first audio stream is playback of content from a tangible storage medium local to the audio output device.

In various embodiments, the tangible storage medium is a compact disc, unified serial bus medium, hard drive, or a computer memory.

In various embodiments, the second audio stream is received by the audio output device with an urgency or maximum delay indicator.

In various embodiments, the one or more processors are configured to identify a maximum delay for output of the second audio stream based on the urgency or maximum delay indicator.

In various embodiments, the one or more processors are configured to determine the insertion spot based, at least in part, on the urgency or maximum delay indicator.

In various embodiments, the one or more processors are configured to find a gap or pause within the first audio stream to determine the insertion spot.

In various embodiments, the one or more processors are configured to analyze the first audio stream using one or more speech analysis techniques to find ends of sentences, phrases, words, or other natural points of interruption to determine the insertion spot.

In various embodiments, the one or more speech analysis techniques includes at least one of Voice Activity Detection (VAD), Automatic Speech Recognition (ASR), and Natural Language Understanding (NLU).

In various embodiments, the one or more processors are configured to find a low volume level within the first audio stream to determine the insertion spot.

In various embodiments, the one or more processors are configured to pause the first audio stream at the insertion spot as a modification of the first audio stream.

In various embodiments, the one or more processors are configured to modify a time-frequency structure of the first audio stream as a modification of the first audio stream.

In various embodiments, the one or more processors are configured to warp the first audio stream at or near the insertion spot as a modification to the first audio stream.

In various embodiments, the one or more processors are configured to modify the second audio stream and output the second audio stream as a modified second audio stream at the insertion spot.

In various embodiments, the modified second audio stream includes a modified time-frequency structure.

In various embodiments, the one or more processors are configured to modify a voice style of the second audio stream to improve intelligibility relative to the first audio stream.

In various embodiments, the audio output device is or forms part of a vehicle head unit.

In various embodiments, the second audio stream is an announcement or an alert from a vehicle navigation system, vehicle monitoring system, or a text to speech system.

In various embodiments, the second audio stream is an announcement or an alert from an advertising system.

In various embodiments, wherein the audio output device is a wireless portable device comprising a mobile phone, tablet, or phablet.

BRIEF DESCRIPTION OF THE DRAWINGS

The present invention will become more apparent in view of the attached drawings and accompanying detailed description. The embodiments depicted therein are provided by way of example, not by way of limitation, wherein like reference numerals refer to the same or similar elements. The drawings are not necessarily to scale, emphasis instead being placed upon illustrating aspects of the invention. In the drawings.

DETAILED DESCRIPTION OF PREFERRED EMBODIMENTS

Various aspects of the inventive concepts will be described more fully hereinafter with reference to the accompanying drawings, in which some exemplary embodiments are shown. The present inventive concept may, however, be embodied in many different forms and should not be construed as limited to the exemplary embodiments set forth herein.

It will be understood that, although the terms first, second, etc. may be used herein to describe various elements, these elements should not be limited by these terms. These terms are used to distinguish one element from another, but not to imply a required sequence of elements. For example, a first element can be termed a second element, and, similarly, a second element can be termed a first element, without departing from the scope of the present invention. As used herein, the term "and/or" includes any and all combinations of one or more of the associated listed items. The term "or" is not used in an exclusive or sense, but in an inclusive or sense.

It will be understood that when an element is referred to as being "on" or "connected" or "coupled" to another element, it can be directly on or connected or coupled to the other element or intervening elements can be present. In contrast, when an element is referred to as being "directly on" or "directly connected" or "directly coupled" to another element, there are no intervening elements present. Other words used to describe the relationship between elements should be interpreted in a like fashion (e.g., "between" versus "directly between," "adjacent" versus "directly adjacent," etc.).

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises," "comprising," "includes" and/or "including," when used herein, specify the presence of stated features, steps, operations, elements, and/or components, but do not preclude the presence or addition of one or more other features, steps, operations, elements, components, and/or groups thereof.

Spatially relative terms, such as "beneath," "below," "lower," "above," "upper" and the like may be used to describe an element and/or feature's relationship to another element(s) and/or feature(s) as, for example, illustrated in the figures. It will be understood that the spatially relative terms are intended to encompass different orientations of the device in use and/or operation in addition to the orientation depicted in the figures. For example, if the device in the figures is turned over, elements described as "below" and/or "beneath" other elements or features would then be oriented "above" the other elements or features. The device may be otherwise oriented (e.g., rotated 90 degrees or at other orientations) and the spatially relative descriptors used herein interpreted accordingly.

Exemplary embodiments are described herein with reference to cross-sectional illustrations that are schematic illustrations of idealized exemplary embodiments (and intermediate structures). As such, variations from the shapes of the illustrations as a result, for example, of manufacturing techniques and/or tolerances, are to be expected. Thus, exemplary embodiments should not be construed as limited to the particular shapes of regions illustrated herein but are to include deviations in shapes that result, for example, from manufacturing.

To the extent that functional features, operations, and/or steps are described herein, or otherwise understood to be included within various embodiments of the inventive concept, such functional features, operations, and/or steps can be embodied in functional blocks, units, modules, operations and/or methods. And to the extent that such functional blocks, units, modules, operations and/or methods include computer program code, such computer program code can be stored in a computer readable medium, e.g., such as non-transitory memory and media, that is executable by at least one computer processor.

In accordance with aspects of the inventive concepts, the system and method behavior is more convenient to the user, e.g., a driver and/or passengers of a vehicle, and reduces or eliminates content loss of a first, e.g., infotainment, audio stream due to an interrupting announcement or alert, as a second audio stream.

Figure 1:
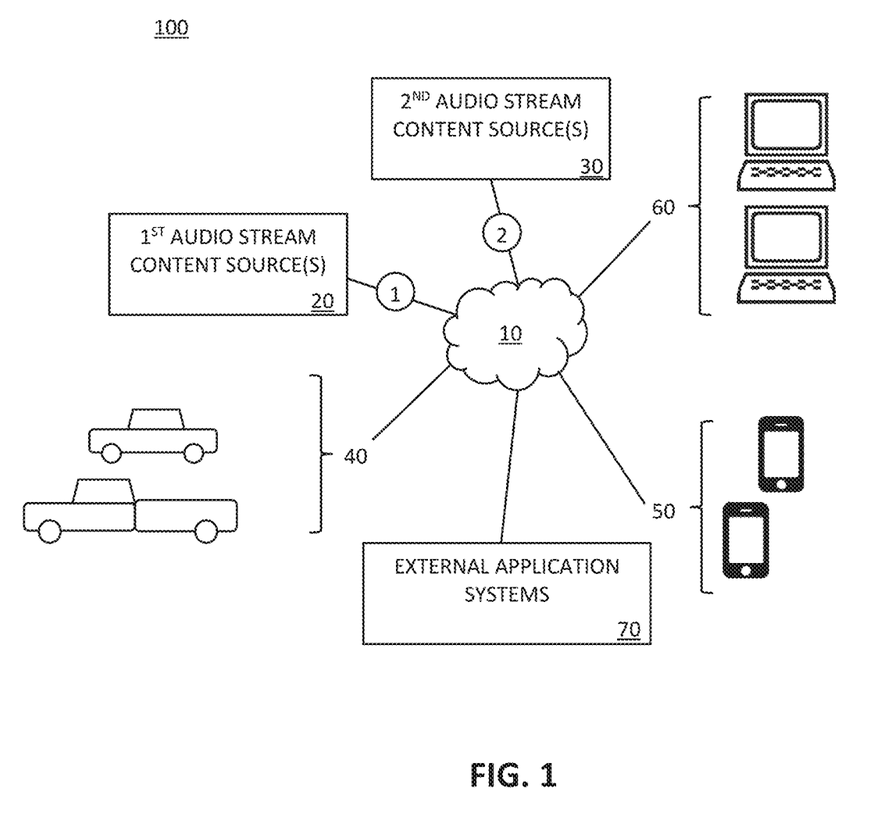
FIG. 1 is a block diagram of an embodiment of an architecture within which audio stream mixing in accordance with aspects of the inventive concepts can be performed.

FIG. 1 is a block diagram of an embodiment of an architecture 100 within which audio stream mixing in accordance with aspects of the inventive concepts can be performed. In the overall architecture 100 of FIG. 1, a variety of systems and devices can communicate via one or more wired and/or wireless communication systems, networks, and/or channels, collectively represented by cloud 10. The communication systems can include the Internet, Global Positioning System (GPS), cellular networks, Wi-Fi, Bluetooth, and so on.

In FIG. 1, vehicles are generally represented as automobiles and trucks 40. While the present invention will be generally described in the context of vehicles, the inventive concepts can be applied to any of a number of vehicles comprising audio output devices, e.g., planes, bicycles, trains, and the like. Additionally, the inventive concepts can, in some embodiments, be applied to other types of audio output devices, which can include, but are not limited to, mobile phones, tablets, phablets, personal computers, laptop computers, televisions (including smart televisions) and the like, collectively indicated as reference numbers 50 and 60 in FIG. 1. When the description herein refers to vehicles or vehicle head units, it is to be understood that the same description could also be applied to other types of audio output devices, such as those mentioned above, unless otherwise stated.

Generally speaking, the phrase "audio output device" as used herein means an electronic device configured to output at least a first audio stream and a second audio stream as an interrupting alert or announcement. The first audio stream can provide any of a variety of types of content, such as infotainment. The second audio stream includes content to be output during output of the first audio stream, which could cause a loss or significant degradation of at least a portion of the first audio stream content. The second audio stream can include time sensitive content or content selectively output by a user during output of the first audio stream.

In FIG. 1, a first audio stream source 20 can provide a first audio stream 1 to at least one audio output device, such as vehicle 40 and/or one or more other types of audio output devices 50 and 60. The first audio stream 1 can be or include music, speech, and/or other forms of audio e.g., infotainment. While FIG. 1 shows the first audio stream source 20 being external to the vehicle 40, it is also possible for the first audio stream source 20 to be local to the vehicle 40, e.g., output from a local or onboard storage medium or system.

A second audio stream source 30 can deliver a second audio stream 2 to the at least one audio output device, such as vehicle 40 and/or one or more other types of audio output devices 50 and 60. The second audio stream 2 can include information that would typically be output as an interruption to the output of the first audio stream, e.g., to cause a loss or significant degradation of the portions of the first audio stream content. Examples of types of second audio streams includes, but is not limited to, navigation system outputs (e.g., time sensitive directions for a driver), incoming text messages converted to output speech, vehicle status outputs, and the like. While FIG. 1 shows the second audio stream source 30 being external to the vehicle 40, it is also possible for the second audio stream source 30 to be local to the vehicle 40, e.g., output from a local or onboard storage medium or system.

In some embodiments, second audio streams 2 can include advertising announcements, public warnings and alerts, or other time-sensitive information, e.g., from external second audio stream sources 30. In some embodiments, the second audio stream 2 can be time sensitive based on a location, condition, or status of the vehicle 40, or a proximity of the vehicle 40 to other vehicles, structures, businesses (e.g., shopping centers, restaurants, sporting venues, and/or entertainment venues), points of interest, or traffic, road, or weather conditions. External second audio stream sources 30 can include navigation systems, advertising and marketing systems, and/or emergency, warning, and advisory systems, as examples, that send second audio streams 2 to a vehicle 40 via one or more communication network and/or system 10.

External application systems 70 can also provide content to the vehicle 40 that is independent of the first or second audio streams 1, 2, but that may be useful for delivering and/or outputting the first and/or second audio streams 1, 2. Such external system can include GPS, cellular services systems, vehicle monitoring systems, and/or other systems that deliver, receive, and/or exchange information and data with the vehicle, systems thereof, and/or device within the vehicle (such as mobile phones of vehicle occupants). For example, such external application systems 70 can be useful for locating and/or tracking the vehicle and/or its occupants, and/or assessing or reporting a status of the vehicle or a subsystem thereof.

Figure 2:
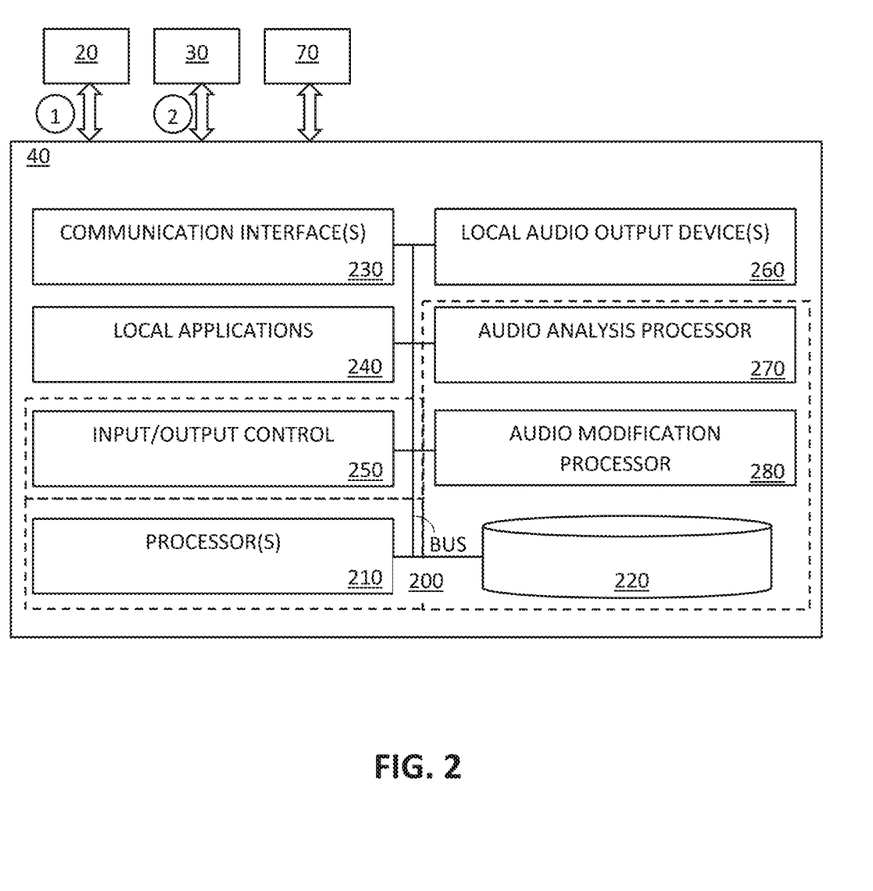
FIG. 2 is a block diagram of an embodiment of an audio stream mixing system, in accordance with aspects of the inventive concepts.

FIG. 2 is a block diagram of an embodiment of an audio stream mixing system 200, in accordance with aspects of the inventive concepts. The audio stream mixing system 200 of FIG. 2 can be part of or hosted by the vehicle 40 (or other audio output device). In some embodiments, the audio stream mixing system 200 can be part of a vehicle head unit responsible for processing and outputting the first and second audio streams 1, 2, e.g., to vehicle occupants. In some embodiments, a vehicle head unit (including the audio stream mixing system 200) and a remote system, e.g., first or second audio stream content sources 20, 30 and/or external application system 70, can cooperatively carry out the audio stream mixing functionality.

In this embodiment, the vehicle (or vehicle head unit) 40 includes at least one processor 210 coupled to at least one computer storage devices or memory 220, e.g., via at least one bus (BUS). The computer storage 220 can take the form of any now known or later developed computer storage device, including, but not limited to, a hard drive, random access memory in its various forms, read only memory in its various forms, and/or a compact disc, as examples. The computer storage 220 can store program code, instructions, and data necessary for the audio stream mixing system 200 to carry out its tasks, including performing the method 300 of FIG. 3. The computer storage 220 can also be configured to store and/or buffer the first audio stream 1, the second audio stream 2, and/or modified forms thereof.

At least one communication interface module 230 can be configured to enable the vehicle 40 and/or audio stream mixing system 200 to communicate and exchange information and data with systems and subsystems external to the vehicle and local to the vehicle. For example, the vehicle 40 and/or audio stream mixing system 200 can be configured to receive the first audio stream 1 from at least one first audio stream source 20 (whether local, onboard, or external) and the second audio stream 2 from at least one second audio stream source 30 (whether local, onboard, or external) via the communication interface module 230. The communication interface module 230 can also enable communication the external applications 70.

In various embodiments, the first audio stream source 20 can be external to the audio stream mixing system 200 of vehicle 40, such as AM/FM radio, satellite radio, or other forms of remote information or entertainment systems. In various embodiments, the first audio source 20 can be local to the audio stream mixing system 200 of vehicle 40, e.g., such as applications 240 local to vehicle 40 for outputting music, audio books, or other audio content from a compact disc, local hard drive, USB device, or from a local device (e.g., mobile phone or portable audio player) coupled to the vehicle 40 via a wired or tethered connection or a short-range wireless connection, e.g., Bluetooth.

In various embodiments, the second audio stream sources 30 can be external to the audio stream mixing system 200, such as a remote navigation system, public alert or warning systems, text systems where the text is converted to speech (text-to-speech (TTS)) in vehicle 40, or advertising systems. In various embodiments, the second audio stream sources 30 can be local to the audio stream mixing system 200, e.g., such as applications 240 local to vehicle 40 for outputting navigation information from an in-vehicle or onboard navigation system or alerts and announcements from a vehicle monitoring and/or warning system.

The first and second audio streams 1, 2 can be output via one or more local (e.g., in-vehicle or onboard) audio output devices 260, such as local or on-board vehicle entertainment systems comprising one or more speakers.

In various embodiments, the audio stream mixing system 200, which is indicated within the dashed lines in FIG. 2, is configured to utilize the processor(s) 210 and computer storage 220 of the audio output device (e.g., vehicle 40), so these shared assets are indicated within the dashed lines of audio stream mixing system 200 in FIG. 2. In other embodiments, the audio stream mixing system 200 could use a different or dedicated processor(s) and/or computer storage.

In this embodiment, audio stream mixing system 200 includes an audio analysis processor 270 configured to buffer first audio stream 1 in computer storage 220 and analyze the first audio stream 1 to determine one or more insertion spots for output of the second audio stream 2. In some embodiments, the audio analysis processor 270 can analyze the first audio stream 1 to locate pauses, audio gaps, and/or low audio levels as insertion spots. In buffering the first audio stream 1, the first audio stream can have a delayed output, e.g., on the order of seconds.

An input/output control module 250 can manage the buffering and output of the first audio stream 1, via the local audio devices 260. The input/output control module 250 can also manage receipt and storage of the second audio stream 2, which can also be buffered in computer storage 220 until output at an insertion spot in the first audio stream 1. Therefore, output of the second audio stream can be delayed and inserted at an insertion spot of the first audio stream. The second audio stream 2 can have an associated urgency indicator that influences or dictates a maximum delay before outputting the second audio stream. In some embodiments, the second audio stream source 30 can include an urgency indicator with or as part of the second audio stream 2. In some embodiments, input/output control module 250 and/or the audio analysis processor 270 can associate an urgency level as a function of the particular second audio stream source 30, where different second audio stream sources can have different associated urgency levels. For example, navigation instructions as a second audio stream can have a predetermined urgency level of maximum delay, e.g., must be output within 10 seconds or less.

The audio stream mixing system 200 can include an audio modification processor 280 configured to modify the first audio stream 1 and, optionally, the second audio stream 2 to accomplish mixing the second audio stream 2 into or with the first audio stream 1 with minimal to no loss or degradation of the content of the first audio stream 1. The audio modification processor can use one or more of a variety of techniques to accomplish the mixing, in conjunction with the input/output control module 250.

In some embodiments, when a new interrupting second audio stream 2 arrives, the audio stream source 30 can indicate an urgency and/or a maximum delay that is acceptable. Based on the indicated urgency and/or maximum delay, the buffered first audio stream 1 is analyzed to find an insertion point in the future audio where an interruption is least disruptive. Part of the analysis performed by the audio stream mixing system 200 may be to classify the first audio stream into music or speech, and then find gaps or pauses in the speech as possible insertion points. Gaps or pauses in speech and/or music lyrics can be found using one or more of a variety of speech analysis techniques, e.g., using Voice Activity Detection (VAD), Automatic Speech Recognition (ASR), and/or Natural Language Understanding (NLU) processing to find ends of sentences, phrases, words, or other natural points of interruption. In some embodiments, speech and/or music can additionally or alternative be analyzed for gaps or pauses or spots with low volume, as possible insertion points.

In various embodiments, once the insertion spot is identified, if the first audio stream 1 is from a medium that can be stopped (e.g. CD, USB, hard drive or other computer storage medium) it will be paused at that point and resumed later, without losing any of the first audio stream content. Although, in some embodiments, pauses or gaps in content of the first audio stream can be omitted as part of the modification to the first audio stream. In various embodiments, if the first audio stream 1 cannot be stopped (e.g., from a radio), the audio before and after the planned insertion of the second audio stream can be warped or otherwise modified in a time and/or a frequency domain to make room for the second audio stream 2.

In some embodiments, portions of the first audio stream 1 before and after the insertion spot for the second audio stream 2 can be warped at, for example, 110% or 120% of its natural speed. Preferably, the warping of the portions of the first audio stream does not substantially degrade the intelligibility of the warped portion. As an example, if the the second audio stream 2 is 6 seconds in length and warping of 120% is used, after 5×6 s=30 s the first audio stream will be fully caught up. The warping can be determined by the audio modification processor 280 and implemented by the input/output control module 250, accessing the buffered first audio stream 1 and the second audio stream 2.

In other embodiments, another technique can be used to modify the first audio stream 1 is to drop unwanted bits of the first audio stream, such as long pauses, which can also be implemented by the audio modification processor 280 and the input/output control module 250. In other embodiments, if the first audio stream 1 is music, the audio modification processor 280 can adjust the volume of the first audio stream to low or mute (a volume level of 0 or near 0) as background and have the second audio stream output more prominently in the foreground, then text-to-speed (TTS) or other second audio stream announcements may be tailored to be still fully understandable in front of the first audio stream, e.g., music.

In various embodiments, the audio modification processor 280 and the input/output control module 250 can boost levels of speech output as a second audio stream 2 depending on first audio stream levels. Another more sophisticated option that can be used in some embodiments is to adjust not only the level of the output, but also the time-frequency structure of the output. In various embodiments, this can be implemented similar to the Lombard effect—when people are in noise, they speak louder and make phonologic adjustment: vowel lengthening, formant shifts, etc. to produce increased intelligibility of the speech within the noise environment. The resultant audio stream speech can be output with some modifications to improve intelligibility in view of the noise, for example by using a parametric coding to improve quality.

In various embodiments, the audio modification processor 280 and the input/output control module 250 can leverage TTS multi-style concepts to differentiate the second audio stream from the first audio stream. Such approaches can be used when mixing the audio streams includes playing the second audio stream 2 as foreground to the background first audio stream 1. Selection of a voice for the second audio stream can be a function of a determined voice style used in the first audio stream, with differentiation between the two voice styles intended to increase intelligibility of the second audio stream in the foreground. For example, depending on the voice in the first audio stream, a formal/more articulated voice or a less formal, more friendly (but hypo-articulated) voice can be used for the second audio stream. In some embodiments, the voice style of the second audio stream could be selected to match specific needs (higher intelligibility against the background, timing vs the other sources, etc.).

Figure 3:
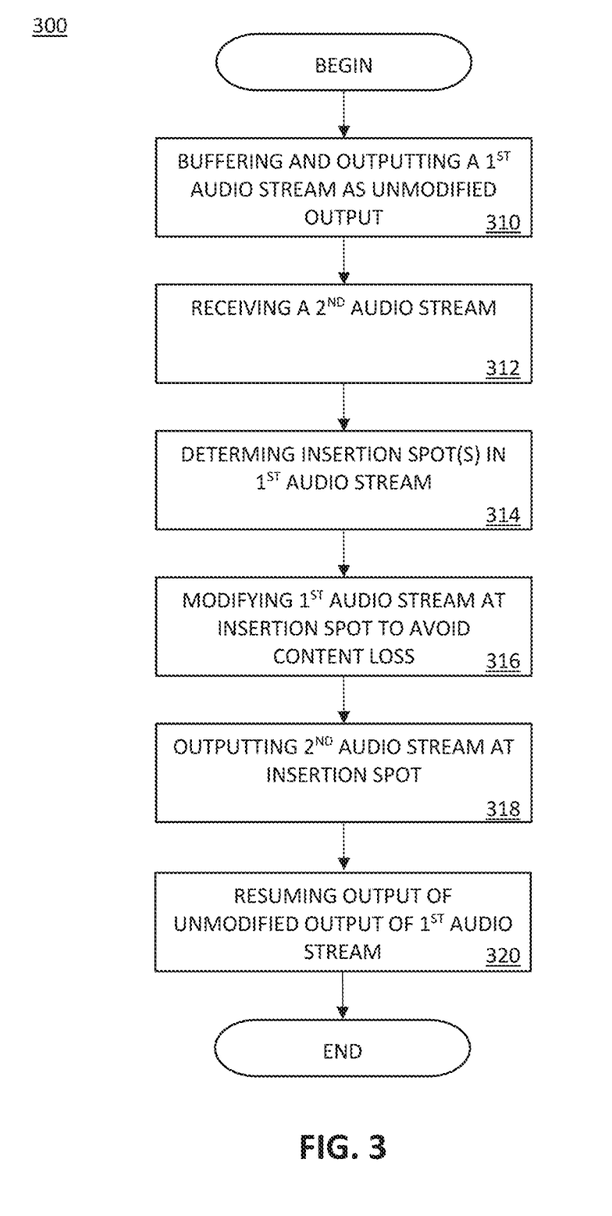
FIG. 3 is an embodiment of a method of audio stream mixing that can be performed by the system of FIG. 2, in accordance with aspects of the inventive concepts.

FIG. 3 is an embodiment of a method 300 of audio stream mixing that can be performed by the system of FIG. 2, in accordance with aspects of the inventive concepts. As described herein, a second audio stream, e.g., an interrupting announcement or alert, is mixed with a first audio stream, e.g., infotainment. In some embodiments, the second audio stream is received during output of the first audio stream, and can initiate the method 300 of FIG. 3. For example, is some embodiments, receipt of the second audio stream can initiate the buffering and/or determination of insertion spots in the first audio stream. In some embodiments, the buffering and determination of insertion spots of the first audio stream can be performed independent of receipt of a second audio stream.

In step 310, a first audio stream 1 is received from a local or external first audio stream source 20 and is buffered by the audio output device, e.g., vehicle 40 or devices 50 and 60. The buffered first audio stream 1 can be buffered and output as a modified or an unmodified audio stream via an audio output device, e.g., of vehicle 40. In step 312, a second audio stream 2 is received by the audio output device from a second audio stream source 30, which can also be buffered. Buffering the second audio stream 2 enables the system 200 to perform analysis to determine where within the first audio stream 1 the second audio stream 2 should be output. The second audio stream 2 can have an associated urgency level or maximum delay indicator used to assist in determining where within the first audio stream 1 the second audio stream 2 can be inserted and output by the audio output device.

In step 314, the first audio stream 1 is analyzed to determine one or more insertion spots for insertion of the second audio stream 2, e.g., and announcement or alert. An insertion spot can be a portion of the first audio stream having a pause, a gap, and/or a low volume, as examples. Determination of one or more insertion spots can be determined based on one or more insertion spot criterion or criteria, including, as examples, volume levels or amplitude, audio signal frequency, audio signal timing, and/or content-based characteristics of the audio, such as natural language processing attributes.

If a plurality of potential insertion spots is determined, step 314 can include selecting an insertion spot from the plurality of insertion spots. Selecting the insertion spot can be based on the earliest insertion spot, the insertion spot having the longest gap or pause, an insertion spot having the lowest volume, an insertion spot having the least disruptive impact to the content of the first audio stream based on speech and/or natural language processing of the first audio stream, or a combination of two or more thereof.

Gaps or pauses in speech and/or music in the first audio stream 1 can be found using one or more of a variety of speech analysis techniques, e.g., using Voice Activity Detection (VAD), Automatic Speech Recognition (ASR), and/or Natural Language Understanding (NLU) processing to find ends of sentences, phrases, words, or other natural points of interruption. In some embodiments, additionally or alternatively, speech and/or music can be analyzed for gaps and/or pauses based on volume levels of the first audio stream, as possible insertion points, where a zero, substantially zero, or relatively low volume level can determined to indicate a gap/or pause in speech or music in the first audio stream.

In some embodiments, the audio stream mixing system 200 and step 314 can implement thresholds for gaps, pauses, and/or low volume levels such that portions of the first audio stream 1 are analyzed against one or more thresholds to determine if they have a sufficiently low volume level for a sufficiently long duration of time to be designated as a gap and/or pause suitable for an insertion spot. In some embodiments, duration may not be utilized in such determinations, e.g., any point where a volume level (or amplitude) of the first audio stream 1 is zero, substantially zero, and/or below a threshold can be determined to be an insertion spot. Using any of a number of voice, speech, and/or natural language processing techniques, a zero, substantially zero, a volume below a threshold at an end of a paragraph, sentence, phrase, or word can be determined as an insertion spot. With respect to volume level thresholds, a volume level threshold can be a predetermined absolute value based on amplitude, a predetermined percentage of a max amplitude for all or a portion of the first audio stream, or a predetermined percentage of an average amplitude for all or a portion of the first audio stream, as examples.

If an urgency or maximum delay is associated with the second audio stream 2, the determination of where in the first audio stream 1 to insert the second audio stream 2 can additionally or alternatively be based, at least in part, on the urgency or maximum delay. For example, if the urgency level and/or maximum delay associated with the second audio stream is 10 seconds, step 314 can include determining at least one insertion spot within the next 10 seconds of the first audio stream. In such cases, any predetermined thresholds can be relaxed or suspended to ensure that the second audio stream 2 is played within the associated maximum delay. For example, within such maximum delay, the audio stream mixing system 200 and step 314 can include determining a best insertion spot, such as a lowest volume portion or least disruptive place in a natural language string to insert the second audio stream, using the techniques discussed above as examples.

In step 316, the first audio stream 1 is modified at the selected insertion spot to accommodate insertion of the second audio stream 2. Modifying the first audio stream can include pausing the first audio stream, warping the first audio stream, adjusting volume and/or frequency aspects of the first audio stream, as examples. The first audio stream can be modified before, during, and/or after insertion of the second audio stream. Warping portions of the first audio stream can be used to cause the first audio stream to catch-up and/or resume unmodified output after insertion of the second audio stream.

If the first audio stream can be stopped, e.g., being output from a CD, USB or hard drive, modification of the first audio stream 1 can be a pause of the first audio stream at the insertion spot and the second audio stream can be inserted at the pause, in step 318. In some cases, any buffered first audio stream, even from an externally sourced audio stream (e.g., radio), can be paused if necessary.

However, if the first audio stream cannot be stopped, e.g., radio, and if the second audio stream has an urgency or a maximum delay that dictates output of the second audio stream before a gap, pause, or low volume portion of the first audio stream, the system 200 may determine to output the second audio stream 2 as foreground audio output (in step 318), with the first audio stream 1 simultaneously as background audio output. Various techniques can be used for modifying the first and/or second audio streams 1, 2 so that both are intelligibly output at the same time, as discussed above. In some embodiments, the second audio stream could also be modified to increase or enhance its intelligibility. For example, in some embodiments, a voice or aspects of a voice of the second audio stream can be modified to enhance intelligibility as foreground content played over the first audio stream as background content, as discussed above.

After insertion of the second audio stream, output of the first audio stream is resumed, in step 320, as modified or unmodified output.

Figure 4A:
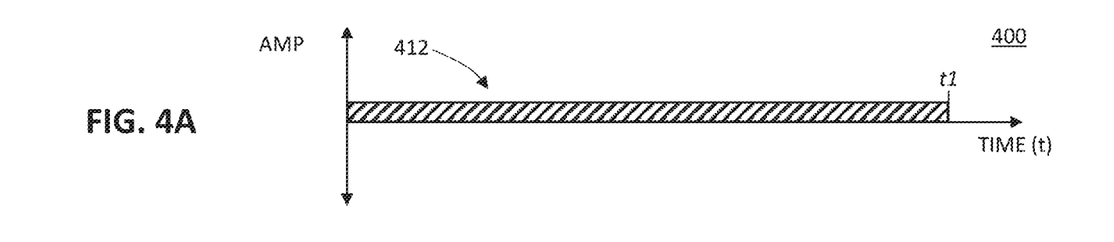
FIG. 4A is an embodiment of a first audio stream.
Figure 4B:
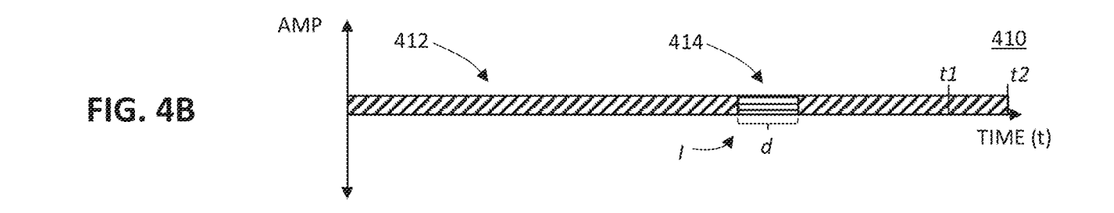
FIG. 4B is an embodiment of the first audio stream of FIG. 4A modified to accommodate a second audio stream, in accordance with aspects of the inventive concepts.
Figure 4C:
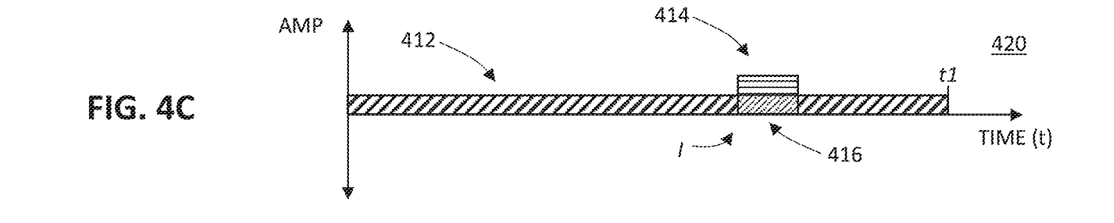
FIG. 4C is another embodiment of the first audio stream of FIG. 4A modified to accommodate a second audio stream, in accordance with aspects of the inventive concepts.
Figure 4D:
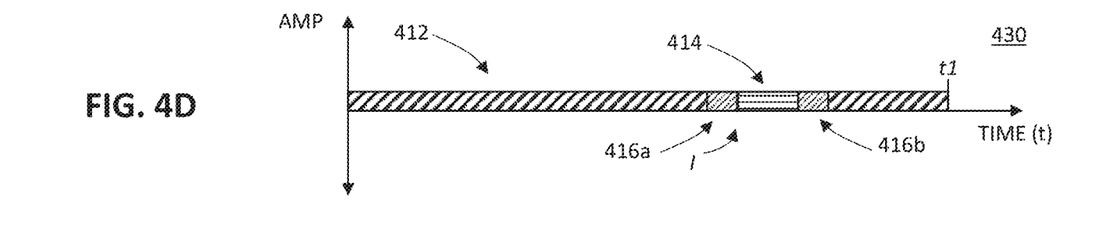
FIG. 4D is yet another embodiment of the first audio stream of FIG. 4A modified to accommodate a second audio stream, in accordance with aspects of the inventive concepts.

FIG. 4A is a graph 400 for describing an embodiment of a first audio stream. FIG. 4B is a graph 410 for describing an embodiment of the first audio stream of FIG. 4A modified to accommodate a second audio stream, in accordance with aspects of the inventive concepts. FIG. 4C is a graph 420 for describing another embodiment of the first audio stream of FIG. 4A modified to accommodate a second audio stream, in accordance with aspects of the inventive concepts. FIG. 4D is a graph 430 for describing yet another embodiment of the first audio stream of FIG. 4A modified to accommodate a second audio stream, in accordance with aspects of the inventive concepts. In these diagrams, audio streams are plotted with amplitude on the y-axis and time on the x-axis.

In FIGS. 4A through 4D, the first audio stream is reference 412, like first audio stream 1 above. Second audio stream is reference 414. In FIG. 4A only first audio stream 412 is shown, as buffered and has a duration of time t1. In FIG. 4B the second audio stream 414 is also shown, and has a duration of d. The second audio stream 414 is inserted in the first audio stream 412 at insertion spot I. In FIG. 4B, the modification to the first audio stream 412 is to pause the first audio stream at the insertion spot I for a duration of d, i.e., the duration, or about the duration, of the second audio stream 418. Time t2, which is the end of the first audio stream 412 after insertion of the second audio stream 414, is equal to or about equal to t1+d≈t2.

In FIG. 4C, the first audio stream 414 is modified at the insertion spot I to accommodate simultaneous output of the first audio stream 412 and the second audio stream 414. The modified portion of the first audio stream 412 is indicated by reference 416. The first and second audio streams can be modified to accommodate intelligible output of the second output stream without significant degradation or loss of content in the first audio stream.

In FIG. 4D, a portion of the first audio stream 416a before the insertion spot I is modified (e.g., warped) and the second audio stream is inserted at the insertion spot. At or near the end of output of the second audio stream 414, a portion of the first audio stream 461b is modified (e.g., warped) so that the first audio stream maintains its original end time t1. In other embodiments, only a portion of the first audio stream before or after insertion of second audio stream 414 can be modified (e.g., warped). In other embodiments, even with modifying a portion of the first audio stream before and/or after insertion of second audio stream, completion of the first audio stream need not happen at or substantially at t1, it could happen after t1 but before t1+d.

Figure 5:
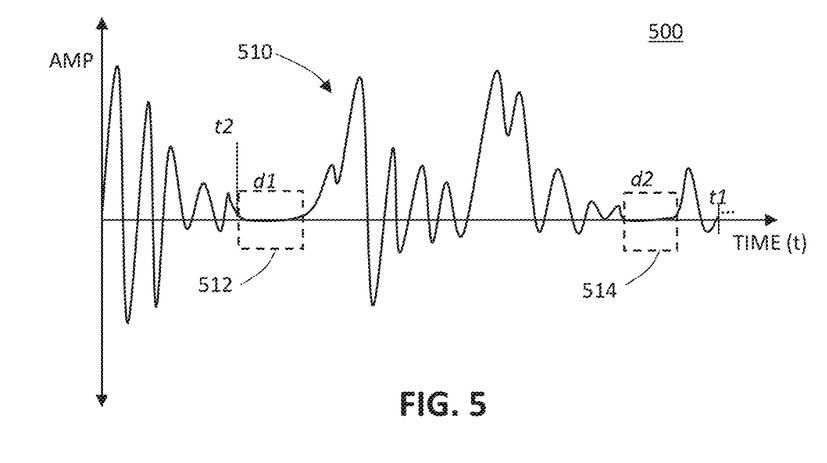
FIG. 5 is an embodiment of a first audio stream.

FIG. 5 is an embodiment of a graph 500 of a first audio stream 510, graphed with amplitude on the y-axis and time on the –axis. In FIG. 5, the audio stream mixing system 200 has determined two potential insertion spots 512, 514. Insertion spot 512 occurs at time t2. Each insertion spot has a zero volume or low volume for a period of time, i.e., d1 for insertion spot 512 and d2 for insertion spot 514. Here, d1>d2. In various embodiments, insertion spot 512 can be selected as the insertion spot, e.g., because it is the first insertion spot, because it is the longest insertion spot, if the second audio stream has an associate urgency or maximum delay that dictates that the second audio stream must be output before the time of the second insertion spot 514, or because of some combination thereof. In various embodiments, the second insertion spot 514 can be selected as the insertion spot, e.g., if speech or natural language processing applied to the first audio stream 510 indicates that the second insertion spot occurs at a more natural and less disruptive portion of the content of the first audio stream, e.g., at the end of a sentence or a line or verse in music content.

Figure 6:
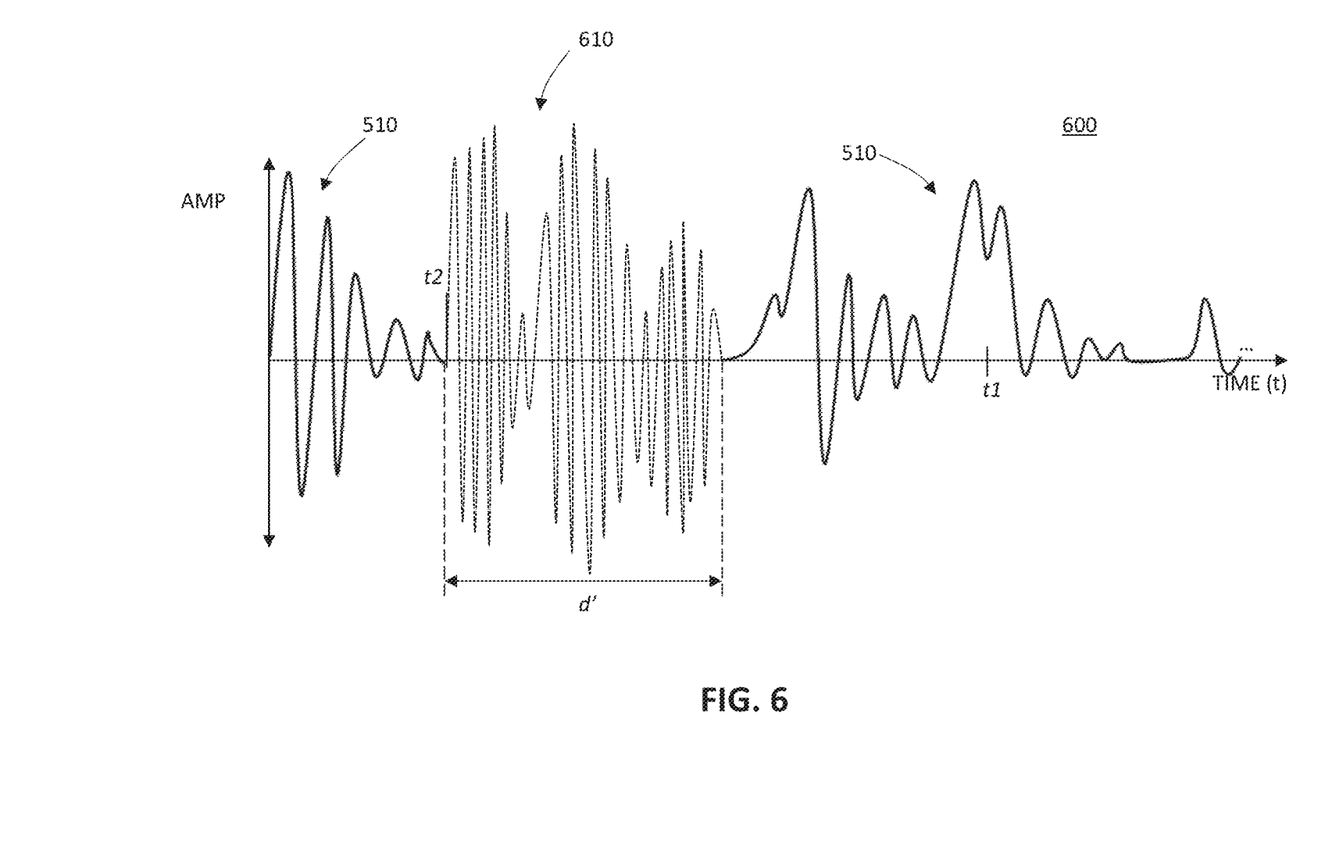
FIG. 6 is an embodiment of the first audio stream of FIG. 5 modified to accommodate a second audio stream, in accordance with aspects of the inventive concepts.

FIG. 6 is an embodiment of a graph 600 of the first audio stream of FIG. 5 modified to accommodate a second audio stream 610, in accordance with aspects of the inventive concepts. In FIG. 6, the first insertion spot 512 has been selected. The second audio stream 610 has been inserted at time t2 of the first audio stream 510. The second audio stream 610 has a duration of d', which is longer than the duration d2 of the insertion spot 512 (see FIG. 5). The first audio stream 512 has been paused for insertion of the second audio stream 610, and the first audio stream 510 has been resumed after completion of the second audio stream 610. In various embodiments, as shown in FIG. 6, a low volume level of the first audio stream 510, which could be a gap or pause in content of the first audio stream 510 can be completely omitted, e.g., not included when the first audio stream is resumed after output of the second audio stream. Due to insertion of the first audio stream, completion of the first audio stream 510 can occur after time t1 in this embodiment.

Figure 7:
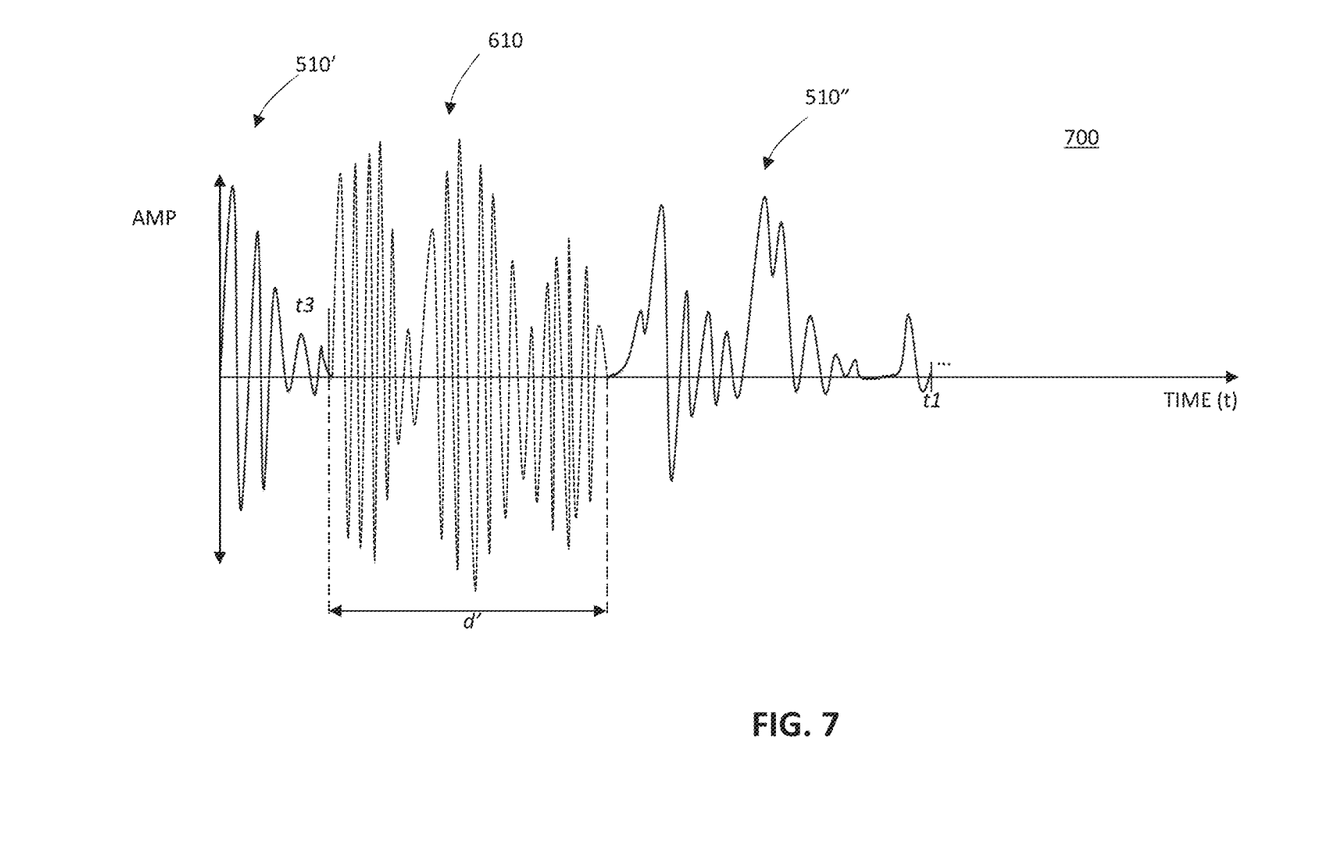
FIG. 7 is another embodiment of the first audio stream of FIG. 5 modified to accommodate a second audio stream, in accordance with aspects of the inventive concepts.

FIG. 7 is another embodiment of a graph 700 of the first audio stream 510 of FIGS. 5 and 6 modified to accommodate the second audio stream 610 of FIG. 6, in accordance with aspects of the inventive concepts. In FIG. 7, the first audio stream 510 has been modified to include a first portion 510' before insertion of the second audio stream 610 and a second portion 510" after insertion of the second audio stream 610. The first portion 510' and the second portion 510" have been warped (e.g., sped up) to cause the first audio stream to complete at time t1, which is the completion time of the unmodified first audio stream 510 of FIG. 5.

Warping the first portion 510' of the first audio stream 510 causes insertion spot 510 to move ahead in time to time t3, where t3<t2 (in FIG. 5). As in FIG. 6, the low-level portion of the first audio stream at the insertion spot need not be included when output of the first audio stream is resumed, with the output of the second portion 510" of the first audio stream 510.

In other embodiments, only the first portion or the second portion of the first audio stream can be warped. Additionally or alternatively, the second audio stream or portions thereof can be warped. In some embodiments, only the second audio stream can be warped to minimize or eliminate the need to modify the first audio stream. For example, if warping the second audio stream causes the second audio stream to intelligibly fit within a duration of an insertion spot, the first audio stream a can be modified to be background or zero volume while the second audio stream is played in the foreground. As another example, the first audio stream can be paused while the second audio stream is output; the first audio stream can then resume with low volume levels of the first audio stream within the insertion omitted. In another embodiment, the first audio stream can be warped, e.g., slowed down, at the insertion spot until completion of the second audio stream.

In various embodiments, other techniques for modifying the first and or second audio streams can be implemented to mix the first and second audio streams with minimal to loss in content of the first audio stream, with aspects of the inventive concepts.

While the foregoing has described what are considered to be the best mode and/or other preferred embodiments, it is understood that various modifications can be made therein and that the invention or inventions may be implemented in various forms and embodiments, and that they may be applied in numerous applications, only some of which have been described herein. It is intended by the following claims to claim that which is literally described and all equivalents thereto, including all modifications and variations that fall within the scope of each claim.

It is appreciated that certain features of the invention, which are, for clarity, described in the context of separate embodiments, may also be provide in combination in a single embodiment. Conversely, various features of the invention which are, for brevity, described in the context of a single embodiment may also be provided separately or in any suitable sub-combination.

For example, it will be appreciated that all of the features set out in any of the claims (whether independent or dependent) can combined in any given way.

What is claimed is:

1. An audio stream mixing system, comprising:
one or more processors coupled to one or more computer storage devices, one or more first audio stream sources, one or more second audio stream sources, and one or more audio output devices, wherein the one or more processors are configured to:
buffer the first audio stream from a first audio stream source in the one or more computer storage devices;
determine an insertion spot within the first audio stream;
output the buffered first audio stream via the one or more audio output devices, wherein the one or more processors are configured to modify output of at least a portion of the first audio stream to accommodate output of a second audio stream at the insertion spot to minimize or avoid content degradation or loss of the first audio stream, the second audio stream received from a second audio stream source;

output the second audio stream via the one or more audio output devices at the insertion spot; and continue output of the buffered first audio stream via the one or more audio output devices after completion of the second audio stream.

2. The system of claim 1, wherein the second audio stream is received during output of the first audio stream.

3. The system of claim 1, wherein the one or more processors are configured to buffer the first audio stream in response to receipt of the second audio stream.

4. The system of claim 1, wherein the first audio stream is a radio stream.

5. The system of claim 1, wherein the first audio stream is playback of content from a tangible storage medium local to the audio output device.

6. The system of claim 5, wherein the tangible storage medium is a compact disc, unified serial bus medium, hard drive, or a computer memory.

7. The system of claim 1, wherein the second audio stream is received by the audio output device with an urgency or maximum delay indicator.

8. The system of claim 7, wherein the one or more processors are configured to:

identify a maximum delay for output of the second audio stream based on the urgency or maximum delay indicator.

9. The system of claim 7, wherein the one or more processors are configured to:

determine the insertion spot based, at least in part, on the urgency or maximum delay indicator.

10. The system of claim 1, wherein the one or more processors are configured to find a gap or pause within the first audio stream to determine the insertion spot.

11. The system of claim 1, wherein the one or more processors are configured to analyze the first audio stream using one or more speech analysis techniques to find ends of sentences, phrases, words, or other natural points of interruption to determine the insertion spot.

12. The system of claim 11, wherein the one or more speech analysis techniques includes at least one of Voice Activity Detection (VAD), Automatic Speech Recognition (ASR), and Natural Language Understanding (NLU).

13. The system of claim 1, wherein the one or more processors are configured to find a low volume level within the first audio stream to determine the insertion spot.

14. The system of claim 1, wherein the one or more processors are configured to pause the first audio stream at the insertion spot as a modification of the first audio stream.

15. The system of claim 1, wherein the one or more processors are configured to modify a time-frequency structure of the first audio stream as a modification of the first audio stream.

16. The system of claim 1, wherein the one or more processors are configured to warp the first audio stream at or near the insertion spot as a modification to the first audio stream.

17. The system of claim 1, wherein the one or more processors are configured to modify the second audio stream and output the second audio stream as a modified second audio stream at the insertion spot.

18. The system of claim 17, wherein the modified second audio stream includes a modified time-frequency structure.

19. The system of claim 17, wherein the one or more processors are configured to modify a voice style of the second audio stream to improve intelligibility relative to the first audio stream.

20. The system of claim 1, wherein the audio output device is or forms part of a vehicle head unit.

21. The system of claim 20, wherein the second audio stream is an announcement or an alert from a vehicle navigation system, vehicle monitoring system, or a text to speech system.

22. The system of claim 1, wherein the second audio stream is an announcement or an alert from an advertising system.

23. The system of claim 1, wherein the audio output device is a wireless portable device comprising a mobile phone, tablet, or phablet.

* * * * *